United States Patent

Yoshioka et al.

[19]

[11] Patent Number: 5,884,280

[45] Date of Patent: Mar. 16, 1999

[54] SYSTEM FOR AND METHOD OF DISTRIBUTING PROCEEDS FROM CONTENTS

[75] Inventors: Makoto Yoshioka; Haruhiko Tsunoda; Kazuharu Hasegawa; Hidefumi Aoe, all of Kanagawa, Japan

[73] Assignee: Fujitsu Limited, Kawasaki, Japan

[21] Appl. No.: 618,221

[22] Filed: Mar. 19, 1996

[30] Foreign Application Priority Data

Sep. 1, 1995 [JP] Japan .................................. 7-248896

[51] Int. Cl.[6] ...................................................... G06F 17/60
[52] U.S. Cl. ............................... 705/26; 705/26; 705/39; 705/17; 705/27; 380/4; 707/500
[58] Field of Search ............................ 705/26, 17, 27, 705/39; 380/4; 707/500

[56] References Cited

U.S. PATENT DOCUMENTS

| | | | |
|---|---|---|---|
| 5,396,417 | 3/1995 | Burks et al. | 705/17 |
| 5,629,980 | 5/1997 | Stefik et al. | 380/4 |
| 5,634,012 | 5/1997 | Stefik et al. | 705/39 |
| 5,664,111 | 9/1997 | Nahan et al. | 705/27 |

*Primary Examiner*—Allen R. MacDonald
*Assistant Examiner*—Jagdish Patel
*Attorney, Agent, or Firm*—Staas & Halsey

[57] ABSTRACT

A content proceeds distribution system distributes proceeds of a sold content to third parties. Each of the third parties has a right of charge, not prescribed in a sales contract, at a rate corresponding to the right thereof. A content database stores by content IDs all providers of the content and all the parties having the right of charge for copying and selling the content. An agreement of a share allocated to an operator of an SD center is registered in a contract master. A payment section, upon a payment of proceeds, subtracts the share of the operator of the SD center from the proceeds by referring to the agreement of the share of the operator that is registered in the contract master. The payment section next distributes the proceeds after subtraction according to each ID stored in the content database.

17 Claims, 13 Drawing Sheets

SYSTEM FOR AND METHOD OF DISTRIBUTING PROCEEDS FROM CONTENTS

BACKGROUND OF THE INVENTION

1. Field of the Invention

The present invention relates to a content proceeds distribution system capable of distributing proceeds obtained by selling contents provided by a content provider.

2. Description of the Related Art

With the widespread use of CD-ROM drives, a content, such as a film, musical work, computer program, database, etc., in the form of software and defined as digital data is frequently distributed through a CD-ROM medium. The CD-ROM medium can be manufactured at low costs and has a large capacity exceeding 500 MB. In addition, CD-ROM drives are decreasing in price and increasing in speed. Further, the CD-ROM is comparatively lightweight and thin for its storage capacity and, therefore, can be distributed by various methods, including being inserted into a magazine for distribution or other uses.

The content of the CD-ROM is stored as digital data; therefore the content can be illegally copied and installed easily (the term "install" herein connotes an introduction of the content into a disk of a personal computer). Accordingly, when distributing the content on the CD-ROM, illegal copying and installation must be prevented.

Accordingly, the following has been practiced to date. In distributing the content by CD-ROM, several types of trial version contents and an encrypted real content are recorded on the CD-ROM, and thus distributed. Only a user paying a using charge (which is a one-time payment) for the content is supplied with a key for decrypting the encrypted real content, permitting the user to use the real content. For the purpose of explanation, the phrase "supplying the key in exchange of the payment of the using charge for the content" is expressed as "selling the content", and the phrase "the using charge for the content" is termed a "sales price of the content".

According to the conventional content distribution system described herein above, proceeds gained by selling the content are, after subtracting a share of a content distribution system operator (hereinafter referred to as a "system operator") therefrom, paid to content providers (hereinafter simply referred to as "providers"). Distribution rates between the system operator and the providers are individually determined based on sales contracts established by the system operator and the providers, when accepting the contents. A sales distributing section in the content distribution system refers to the distribution rate of the relevant content that is registered in the database stored with the sales contracts, and then pays the provider an amount of money in proceeds, which amount is determined by the above-mentioned distribution rate.

However, third parties (such as a copyright owner, a performer having a copyright in a related work, author(s) having claims against the copyright owner, or other copyright claimants) may exist who have a right (or claim for a continuing royalty) to this content, in addition to the rights of the providers who are parties to, and whose rights are defined in accordance with the terms of, the sales contract. Generally, items indicating these relationships of right of the third parties are excluded from being explicitly defined in the sales contract. Hence, it is impossible to distribute the proceeds among the third parties having the right (right of charge for a running royalty) to the proceeds simply by referring to the sales contracts stored in a database. For this reason, in the conventional content distribution system, the provider has to distribute individually the proceeds paid from the system operator to all of the parties having rights to the content.

SUMMARY OF THE INVENTION

To overcome the above-mentioned problems, a primary object of the present invention is to provide a content proceeds distribution system and a distribution method for distributing proceeds to third parties, each having a right of charge which is not prescribed in a sales contract covering a sold content, at a rate corresponding to the right of each of the third parties.

To accomplish the above object, the present invention is a content proceeds distribution system in a content distribution system. The content proceeds distribution system of the present invention distributes proceeds, obtained by selling a content provided by a content provider, to specified distributees. The content proceeds distribution system of the present invention comprises a first database, a second database, a first reading section, a subtracting section, a second reading section, and distributing section. FIG. 1 is a principle diagram illustrating the present invention.

As shown in FIG. 1, the first database 10 stores a first item of distribution data. The first item of distribution data indicates a rate at which an amount of money of the proceeds is distributed to an operator of the content distribution system.

Also as shown in FIG. 1, the second database 11 stores a second item of distribution data. The second item of distribution data indicates distribution rates and the distributees of a remaining amount of the proceeds, after being distributed to the operator.

The first reading section 12 reads the first item of distribution data from the first database 10, as illustrated in FIG. 1.

Referring to FIG. 1, the subtracting section 13 subtracts money, corresponding to the rate specified in the first item of distribution data read by the first reading section 12, from the proceeds.

The second reading section 14 reads the second item of distribution data from the second database 11 in FIG. 1.

As shown in FIG. 1, the distributing section 15 distributes an amount of money, obtained by multiplying the remainder after the subtraction by the subtracting section by the corresponding distribution rate specified in the second item of distribution data, to each of the distributees 16 specified in the second distribution data read by the second reading section 14.

According to the content proceeds distribution system of the present invention, the first database stores the first distribution data indicating a rate of the money distributed to the operator of the content distribution system with respect to the proceeds gained by selling the content provided by a content provider. Further, the second database stores the second item of distribution data indicating the distributees and the distribution rates of the remaining amount of money distributed to the above operator with respect to the proceeds. When the proceeds are actually gained, the first reading section reads the first item of distribution data from the first database. The subtracting section subtracts the amount of money corresponding to the rate specified in the first item of distribution data read by the first reading section from the proceeds.

Further, the second reading section reads the second item of distribution data from the second database. Then, the distributing section distributes the amount obtained by multiplying the remainder after the subtraction by the subtracting section by the corresponding distribution rate specified in the second item of distribution data to each of the distributees specified in the second item of distribution data read by the second reading section. Accordingly, even if there are a plurality of rightful parties, each entitled to a receiving part of the proceeds, i.e., the plurality of specified payees, with the present invention, the effort of distributing the proceeds to the plurality of payees after one provider acting as a representative has received the proceeds can be eliminated.

In the present invention, the content may include software comprising a program, musical data and video data such as a film, etc. This content may be stored in an analog format or in a digital format. If the content is stored in digital format, the content can be encrypted. As a content distribution system which encrypts the content, it is feasible to distribute a content which is encrypted, then supply a key for decrypting the content to a party who desires to purchase the content. By encrypting the content then supplying a key to decrypt the content, the content can be sold through communications channels, and, therefore, allowing the content distribution to be conducted smoothly. Further, the proceeds may be collected from the purchaser as compensation for supplying the purchaser with the key for decrypting the content, as described herein above.

The specified distributees may include all of the content providers defined as copyright owners, copyrighters or publishing rightful parties of the contents. Further, the specified distributees may include copyrighters of original authored works of the contents as well as copyrighters of authored works utilized in the contents. Moreover, the specified distributes may include an author who transferred or assigned the copyright to the content provider by contract in exchange for receiving from the content provider a predetermined royalty for each copy of the content distributed.

The distribution rate specified in the second distribution data may be clearly shown, but if not clearly shown, is dealt with as an even rate.

The content proceeds distribution system according to the present invention further comprises a recording section and a calculating section. The recording section records a sales price and the number of sales of the same content. The calculating section calculates a total sum of the proceeds of the same content on the basis of the sales price and the number of sales that are recorded by the recording section. In this case, the subtracting section performs the subtraction from the total sum of the proceeds calculated by the calculating section. With the above-mentioned construction, the overhead of distributing the proceeds each time the individual content is sold may be eliminated.

Further, according to the present invention, a content proceeds distribution method is provided in a content distribution system for distributing proceeds obtained by selling a content provided by a content provider to specified distributees. The content proceeds distribution method comprises a first storing step and a second storing step. The same method, when distributing the proceeds, also comprises a first reading step, a subtracting step, a second reading step, and a distributing step.

The first storing step stores in a first database a first item of distribution data of a rate at which an amount of money of the proceeds is distributed to an operator of the content distribution system.

The second storing step stores in a second database a second item of distribution data of distribution rates and the distributees of an amount of money of the proceeds after being distributed to the operator.

The first reading step reads the first distribution data from the first database.

The subtracting step subtracts money corresponding to the rate specified in the read first distribution data from the proceeds.

The second reading step reads the second distribution data from the second database.

The distributing step distributes an amount of money, obtained by multiplying the remainder after the subtraction in the subtracting step by the corresponding distribution rate specified in the second distribution data, to each of the distributees specified in the second distribution data read in the second reading step.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention are discussed herein below with reference to the accompanying drawings.

Figure 1:
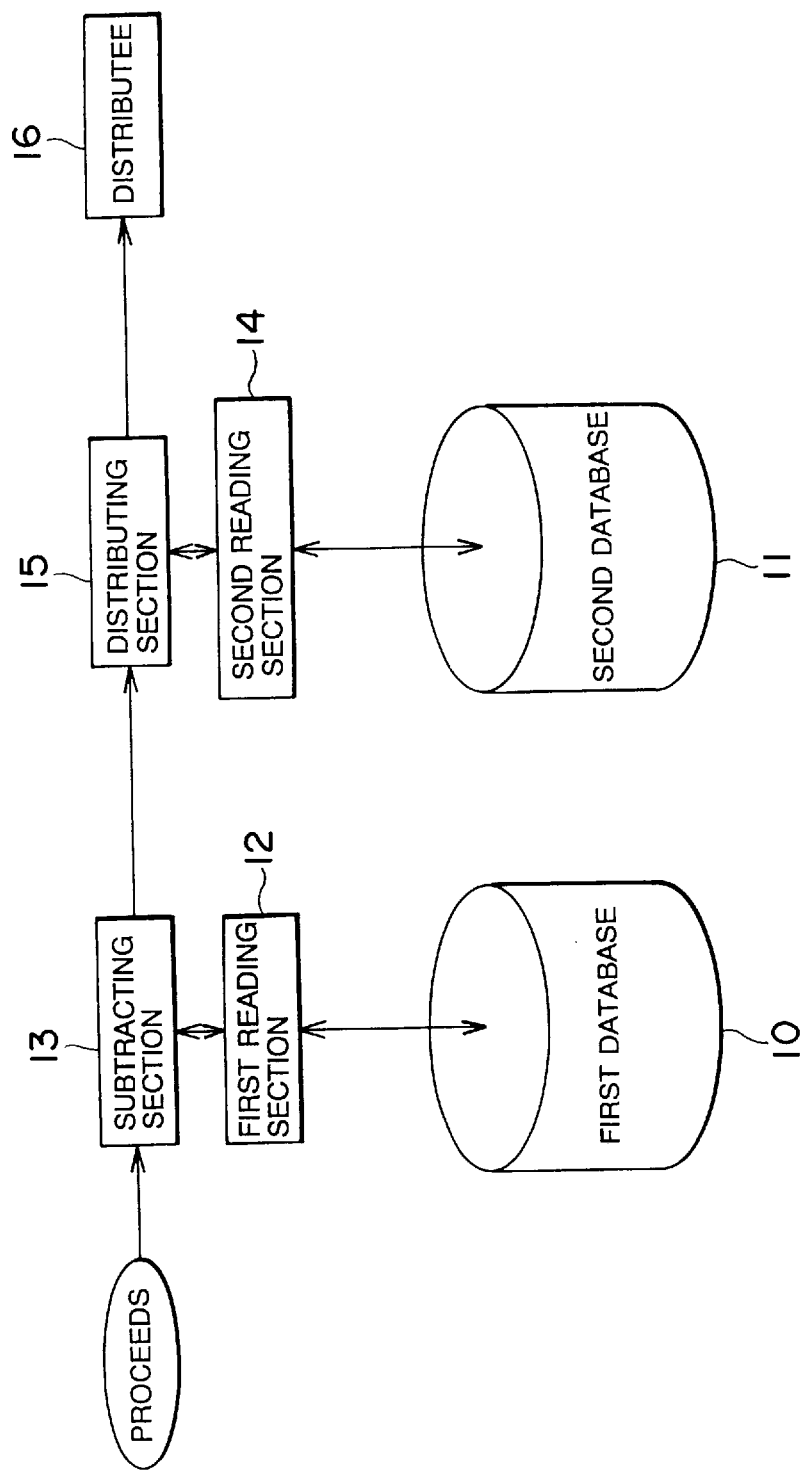
FIG. 1 is a diagram showing the principle of the present invention.
Figure 2:
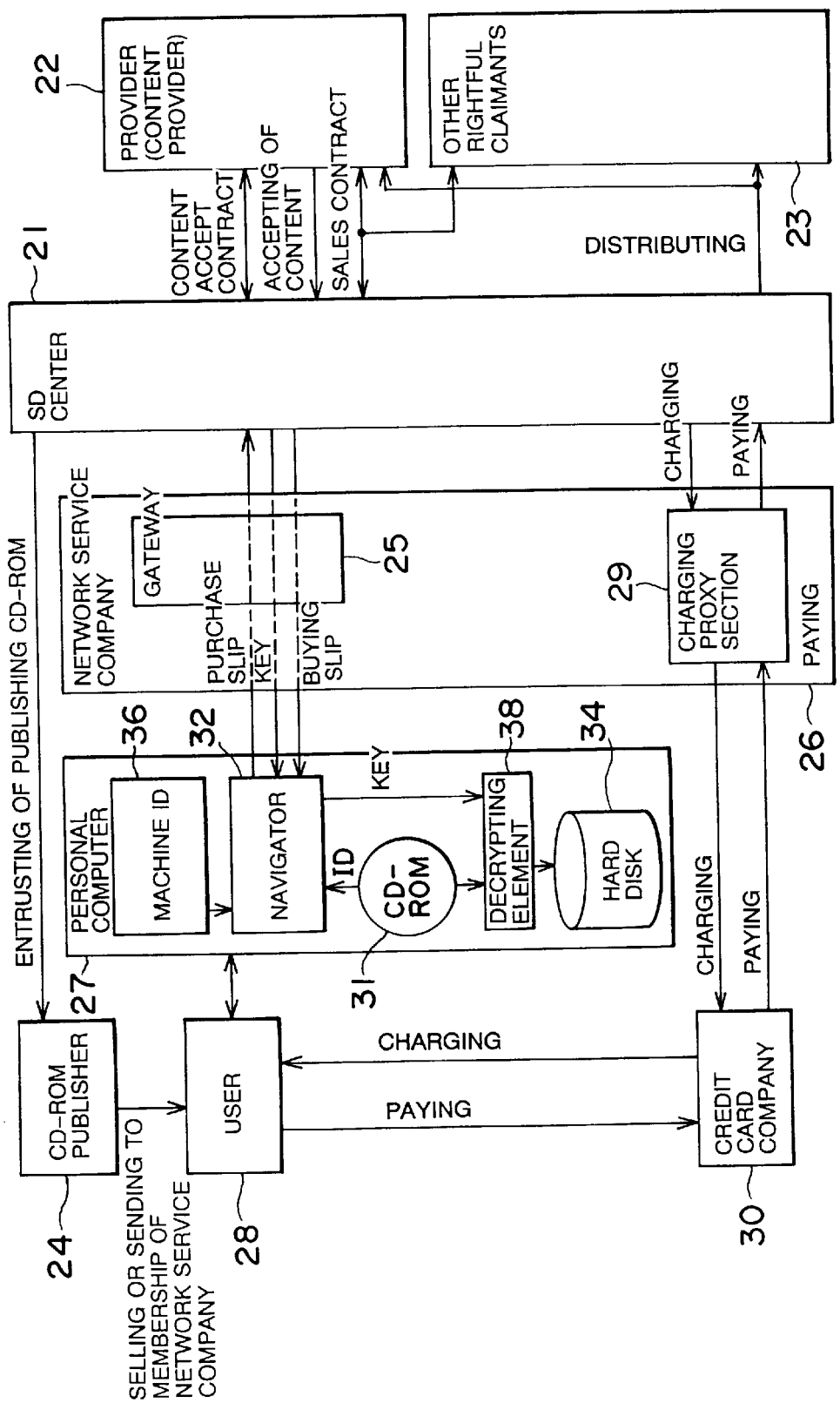
FIG. 2 is a diagram illustrating an outline of a content distribution system of a first embodiment of the present invention.

FIG. 2 is a block diagram illustrating an outline of a content distribution system of a first embodiment of the present invention. Referring to FIG. 2, an SD center 21 is equipment serving as a center of the content distribution system. An operator operating the SD center 21 may be also an enterpriser or entrepreneur of a content distribution enterprise utilizing this content distribution system. The operator in the SD center 21 enters into a content accept contract with a provider 22 for a variety of contents. The SD center 21 accepts the contents from the provider 22 on the basis of this content accept contract. Then, the operator operating the SD center 21 enters into a sales contract with respect to contents determined for sales among those accepted and distributes part of proceeds of the sold contents to the providers 22. Further, as need be, the operator of the SD center 21 enters into a sales contracts with rightful claimants 23 other than the providers 22 and distributes part of the proceeds in accordance with that sales contract.

The SD center 21 encrypts and records on a single, original CD-ROM the contents of the established sales contract. Recorded also together during this editing session a navigator (which is a software program) executing a series of processes for decrypting the encrypted contents of the CD-ROM and an installer (which is also a software program) for this navigator. The SD center 21, after performing such editing, sends a request to a CD-ROM publisher 24 to publish this CD-ROM.

The SD center 21 is connected via a gateway 25 to a network service company 26. The SD center 21 is connected via the network service company 26 and a public telephone network (which is not shown) to a personal computer 27 belonging to a user 28. The SD center 21 transmits, to the personal computer of the user 28 via the network service company 26, a buying slip and a key for decrypting the content indicated on a purchase slip, corresponding to the purchase slip transmitted via the network service company 26 from the personal computer 27. Also, the SD center 21 issues a demand for payment of the prices of the content sold as described herein above to a charging proxy section 29 of the network service company 26. The charging proxy section 29 issues payment of the above-mentioned prices to the SD center 21, as shown in FIG. 2.

The provider (content provider) 22 is normally a copyright owner or a creator (such as the author) of the content. More specifically, the provider (content provider) 22 may be a sole copyright owner or a sole creator of a certain content (a so-called primary authored work, secondary authored work, authored film work and authored editing work), all of the co-copyright owners or co-creators of a certain content, and all of the copyright owners or creators of respective constructive elements of an aggregative authored work. Those are direct copyright owners or creators (so-called modern authors) of the relevant contents. Unless sales contracts with those copyright owners or creators are entered into, the SD center 21 is not allowed to sell the relevant contents. Each provider 22 has an unique ID (authoring ID).

Other rightful claimants 23 are third parties other than the providers 22 and may be persons who have a right of directly charging the SD center 21 if the relevant contents are to be copied and have a charge (right of charge for running royalty, etc.) assertable directly against the SD center 21 if the contents are copied. A specific example of the former case are copyright owners or creators (so-called classical authors) of original authored works with respect to the secondary (or derivative) authored works and the film authored works, copyright owners or creators of authored works applied to the film authored works, performers of musical authored works and copyright owners or creators of respective constructive elements in the edited authored works. The SD center 21 is prohibited from copying the relevant contents without approval of those copyright owners and therefore must enter into a sales contracts with those authors.

Another specific example of the latter case is creators who are not copyright owners but are persons entered into a running royalty payment contract with a copyright owner (provider 22 or copyright owner as applied to the former case) when transferring a right of the work. The SD center 21 is not required to enter into a sales contract with those persons and therefore has in principle no necessity for directly distributing the proceeds from the contents to those persons. In an ex post facto manner, however, the provider 22 must distribute a share distributed to the provider himself or herself to those persons in the form of a running royalty. Accordingly, if the shares of those persons are distributed directly from the SD center 21, the overhead of the provider 22 is reduced. Each of those other rightful claimants 23 has an unique ID (such as a creator ID).

The network service company 26 represents an enterpriser or entrepreneur providing network data communications such as personal computer communications and also represents a host computer thereof. The network service company 26 is, in response to a connection request received from a personal computer 27, connected via the public telephone network (which is not shown in FIG. 2) to this personal computer 27 of the user 28 registered with a membership and to the SD center 21. Then, the network service company 26 implements a variety of data switching services between the respective personal computers 27 connected thereto and the SD center 21. The user 28 must register his or her own valid credit card number in the network service company 26 by way of a debit of a service charge as a prerequisite for the registration of the membership of the network service company 26.

Further, the charging proxy section 29 of the network service company 26, in response to a charge of the content price from the SD center 21, adds an amount of money of this charge to the service using charge of the membership user 28 defined as a content purchaser. Then, the charging proxy section 29 charges a credit card company 30 offering the credit card number to the membership user 28, the card number being registered in the network service company 26, for the service using charge to which the content price is added. When the credit card company 30 pays the service using charge in response to the above-mentioned charge, the network service company 26 deducts the primary service using charge and a predetermined fee and pays the remainder to the SD center 21.

The credit card company 30 debits the service using charge charged by the charging proxy section 29 from the user 28 (more specifically, from an account, such as a bank account, of the user 28).

The CD-ROM publisher 24 receives an entrustment for publishing the CD-ROMs 31 from the SD center 21 and mass-produces the original CD-ROM transferred from the SD center 21. The CD-ROM publisher 24 sells the thus copied CD-ROMs 31 to the users 5 or sends the CD-ROMs 31 to the users 28 as registered memberships of the network service company 26 free of charge.

The user 28 down-loads the CD-ROM 31 obtained from the CD-ROM publisher 24 into his or her own personal computer 27. Then, the user 28 executes an installer program stored in the CD-ROM 31. The installer program installs a navigator 32 onto a hard disk 34 of the personal computer 27 and generates a machine ID 36 from a formation of random numbers, etc. The installer program then writes this machine ID 36 to the hard disk 34 of the personal computer 27. The installer program does not generate a new machine ID 36 if the machine ID 36 has already been generated in this hard disk 34.

When the navigator 32 is executed within the personal computer 27, the navigator 32 generates a decrypting element 38. Then, the navigator 32, in accordance with an input from the user 28, enables the user 28 to try out a trial version content within the CD-ROM 31 and also creates a purchase slip (text data) for purchasing the content that the user 28 desires to purchase. Also, the navigator 32 is connected to the network service company 26 by making use of a communication program (which is not shown) and is further connected to the SD center 21 via the gateway 25 to transmit the created purchase slip to the SD center 21. Written into this purchase slip are a CD-ROM number (which is unique to each type of CD-ROM) and a content ID (which is unique to every content) and an access number generated from the CD-ROM number, the content ID and the machine ID, and an ID (hereinafter referred to as user ID) of the relevant user 28 that is registered in the network service company 26. When a key (for demodulating the encrypted content) encrypted by this access number is sent back from the SD center 21, the navigator 32 decrypts the key with the recorded access number and transfers the decrypted key to the decrypting element 38. The decrypting element 38 reads the (encrypted) content that the user 28 desires to purchase from the CD-ROM 31 and decrypts the content by use of the key and stores the decrypted content onto the hard disk 34.

Next, internal construction of the SD center 21 is described in detail with reference to FIG. 3.

Figure 3:
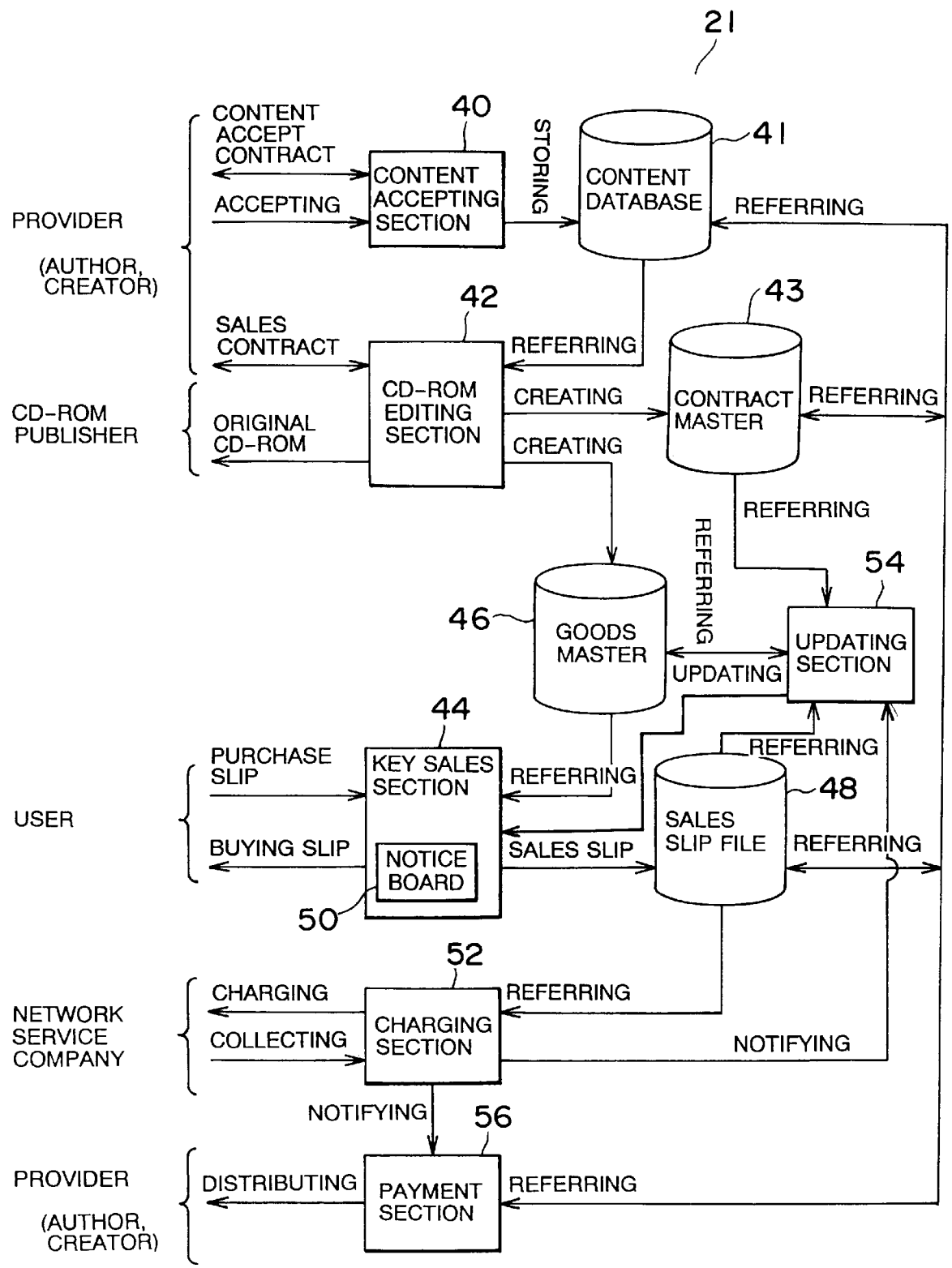
FIG. 3 is a block diagram illustrating a detailed configuration of an SD center shown in FIG. 2.

As shown in FIG. 3, a representative of the content accept section 40 enters into a content accept contract with the provider 22. The content accept contract provides that the SD center 21 keeps the relevant content in preparation for subsequently distributing the relevant content via a content distribution system based on the SD center 21. As a result of establishing this content accept contract, the content accept section 40 accepts the content. Then, an ID (content ID) of the accepted content is generated, and a content database 41 stores the relevant content together with this content ID. Further, the content accept section 40 stores in the content database 41 with an item of provider data relative to this content. This item of provider data may be an ID (authoring ID) of the provider (author) 22 as a party concerned with the content accept contract, an ID of a party excluding the provider 22 but requiring an establishment of the relevant content sales contract, and an ID of a party requiring no establishment of the content sales contract but having the right to charge for a running royalty relative to the sales of the relevant content with respect to the provider 22. The IDs of those parties are hierarchically stored in the content database 41, with the ID (authoring ID) of the provider 22 being an uppermost layer. If the shares are agreed upon between those parties, an item of data regarding the agreed upon shares of those parties is also stored as an item of provider data in the content database 41 and defined as a second database. That is, this item of provider data corresponds to second distribution data about distribution rates and distributees of a remaining amount of money after being distributed to the operators.

The following are specific examples of this item of provider data. A letter indicates an ID of the provider, etc., and a symbol "*" indicated that a relevant party exists, but this is not contained in each of the following examples.

Table 1 is shown as follows.

| Author | Share | Party Requiring Contract | Share | Other Creators | Share |
|---|---|---|---|---|---|
| A (Film Creator) | | B (Original Author) C (Scenario Writer) | | E (Film Director) | |

Table 1 shows an example in which the content is a film authored work. In this case, the copyrighter (author) serving as the provider 22 is only one film creator A. However, the original author B, the scenario writer C and a painter D who depicts a picture used in the work are also the parties requiring the sales contract as so-called classical authors. Further, it is assumed that the film director E also as an author enters into a contract to receive the running royalty from the film creator A with the sales of the content. In this case, however, the above parties did not agree on the shares, and therefore the shares of the respective parties are evenly dealt with.

A second specific example is illustrated herein below.

Table 2 is shown as follows:

| Author | Share | Party Requiring Contract | Share | Other Creators | Share |
|---|---|---|---|---|---|
| F (Co-copyrighters) G (Co-copyrighters) | | | | | |

Table 2 shows an example where the content is concerned with co-authors, and the author remains as a copyright owner. In this instance also, the shares (holdings) of the respective co-copyrighters F, G are not agreed upon and are therefore evenly dealt with.

A third specific example follows.

Table 3 is shown as follows:

| Author | Share | Party Requiring Contract | Share | Other Creators | Share |
|---|---|---|---|---|---|
| H (Co-Copyright owners) | 0.7 | | | | |
| I (Co-copyright owners) | 0.3 | | | | |

Table 3 shows an example in which the shares (holdings) are agreed upon between respective co-copyright owners, H and I. In this case, the shares (holdings) are agreed upon. Hence, when distributing the proceeds, the co-copyright owner H receives a payment of 70% of the proceeds, while the co-copyright owner I receives a payment of 30% of the proceeds.

Table 4 shows a fourth specific example.

Table 4 is shown as follows:

| Author | Share | Party Requiring Contract | Share | Other Creators | Share |
|--------|-------|--------------------------|-------|----------------|-------|
| J (Representative) | | * | | | |

Table 4 is an example in which only a representative J is clearly shown, and a party exists who requires a sales contract in addition to this representative J. In this instance, the SD center 21 recognizes only the representative J and therefore may pay the proceeds to only one representative J. The representative J has an obligation to distribute the proceeds to other rightful claimants who are not clearly indicated irrespective of a participation of the SD center 21. However, the SD center 21, when establishing the sales contract, can determine from the symbol "*" that the rightful claimants other than the representative J are the concerned parties of the contract.

A CD-ROM editing section 42 analyzes a market and specifies contents to be written to the CD-ROM among a group of contents already stored in the content database 41. Then, a representative of the CD-ROM editing section 42 enters into a sales contract with the provider 22 and other rightful claimants (exclusive of the parties simply having only the charges against the provider 22) who should be contract parties concerned. According to this sales contract, the IDs of the provider 22 and of other rightful claimants 23 as the contract parties concerned, the content ID, a sales price, a sales effective period (indicating what time to start and terminate the sale of content), a payment site (distribution rate corresponding to the first distribution data relative to a rate of money distributed to the operator of the content distribution system among the proceeds) of the proceeds between the provider 22 and the operator of the SD center 21 and whether or not the sales price is reduced, are agreed upon. The CD-ROM editing section 42 stores contents of this sales contract into a contract master 43 serving as a first database.

Further, the CD-ROM editing section 42 encrypts the content, in accordance with the terms of the sales contract which has been established, by use of a specified key and writes the content to the original CD-ROM. Written also to this CD-ROM are the above-mentioned CD-ROM number, the navigator (which is a program) and the installer. The CD-ROM editing section 42 entrusts the CD-ROM publisher 24 to publish the CD-ROM by transferring the thus edited original CD-ROM thereto. Further, the CD-ROM editing section 42 writes to a goods master 23 the CD-ROM number of this original CD-ROM, an effective period thereof and the content ID, the sales price, the sales effective period and the key of the content written to this original CD-ROM. The goods master 23 is a database storing each of the foregoing items.

A key sales section 44 receives the purchase slip sent from the personal computer 27 of the user 28 and checks the CD-ROM number, the content ID and an access number that are recorded on this purchase slip by referring to the goods master 46. Then, if the effective period of the CD-ROM 31 has already terminated, the effective sales period of the content has terminated, or the goods master 46 includes no data corresponding to the numbers or the IDs thereof, an error message is output. In cases other than this, a corresponding key is read from the goods master 46 and encrypted by the access number, and an item of data obtained as a result of this encryption is sent in the form of a purchase number back to the personal computer 27 of the user 28. With the sending of this purchase number, the key sales section 44 imposes a charge. More specifically, the key sales section 44 reads a sales price of the content sold from the goods master 46, puts the content ID and the sales price thereof on the purchase slip and sends the slip to the personal computer 27 of the user 28. The key sales section 44 also accumulates sales slips, containing the same items and the user IDs of the users 28 as the purchasers, in a sales slip file 48, which stores the foregoing items in a database.

This key sales section 44 includes a notice board 50 on which the IDs of the individual contents stored in the goods master 46, titles thereof, and sales prices thereof, are copied. This notice board 50 is accessed through the navigator 32 of the personal computer 27 from the user 28.

A charging section 52 settles the number of sales per provider as well as per content with reference to a sales slip file 48 for each month and notifies an updating section 54 of a result of this settlement. Further, the charging section 52 adds up an amount of proceeds per user ID of the user 28 and charges the charging proxy section 29 of the network service company 26 for the proceeds in bulk. When the charging proxy section 29 pays the proceeds in response to this charge for the proceeds, the charging section 52 notifies a payment section 56 of this payment.

Figure 4:
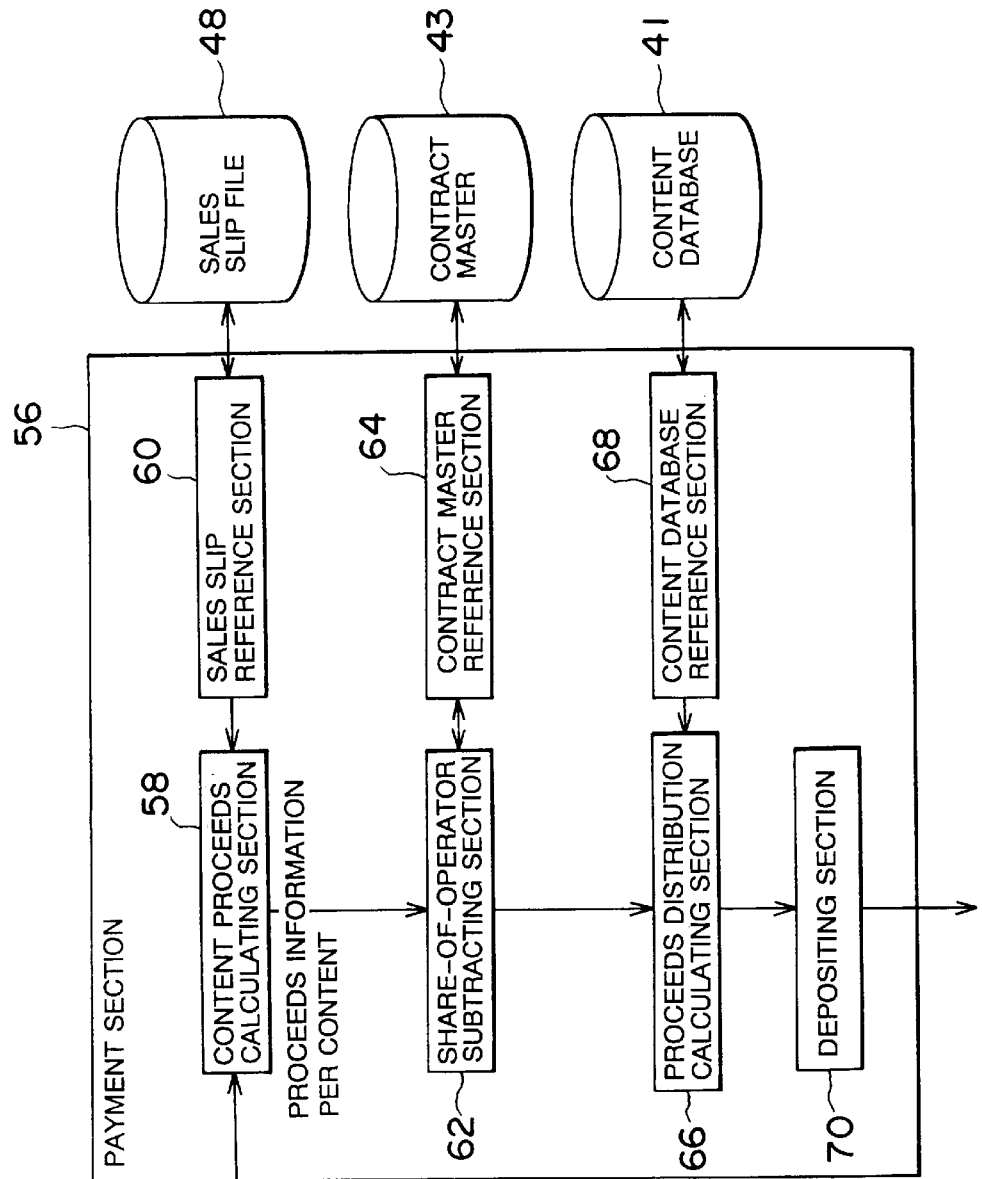
FIG. 4 is a block diagram illustrating a detailed configuration of a payment section shown in FIG. 3.

FIG. 4 illustrates an internal construction of the payment section 56. A content proceeds calculating section 58, upon receiving the notice from the charging section 52, indicates to a sales slip reference section 60 to read the sales slips accumulated in the sales slip file 48. The sales slip file 48 is defined as a recording section. The content proceeds calculating section 58, serving as a calculating section, adds up an amount of proceeds per content on the basis of the read sales slips and notifies a share-of-operator subtracting section 62 of the amount added up by the content proceeds calculating section 58.

Upon receiving a notice of the proceeds per content from the content proceeds calculating section 58, the share-of-operator subtracting section 62 (serving as the subtracting section) indicates to a contract master reference section 64, which is a first reading section, to read a payment site of each content that is stored in the contract master 43. The share-of-operator subtracting section 62 subtracts a share allocated to the operator of the SD center 21 that is determined by the payment site from the proceeds for each content and notifies a proceeds distribution calculating section 66 of a result of this subtraction.

The proceeds distribution calculating section 66, serving as a distributing section, upon receiving the notice of the proceeds after being subtracted from the share-of-operator subtracting section 62, indicates to a content database reference section 68, defined as a second reading section, to read the provider data of each content recorded in the content database 41. The proceeds distribution calculating section 66 distributes the notified proceeds to the respective providers (authors), the IDs of which are recorded in the form of the provider data, and other rightful claimants 23 per content. At this time, if the provider data contains an agreement of the shares of the individual providers (authors) 22 and other rightful claimants 23, the proceeds are distributed in accordance with the agreement of the shares thereof. If not agreed upon, the proceeds are evenly distributed to the individual parties. The proceeds distribution calculating section 66 adds up the proceeds per ID (registered as the one of the provider 22 or other rightful claimants 23) and notifies a (money) depositing section 70.

The (money) depositing section 70 deposits money of the proceeds added up per ID. More specifically, the money depositing section 70 specifies bank accounts of each provider 22 and of other rightful claimants 23 on the basis of the IDs, and deposits the money of proceeds added up into the specified bank accounts.

Figure 5:
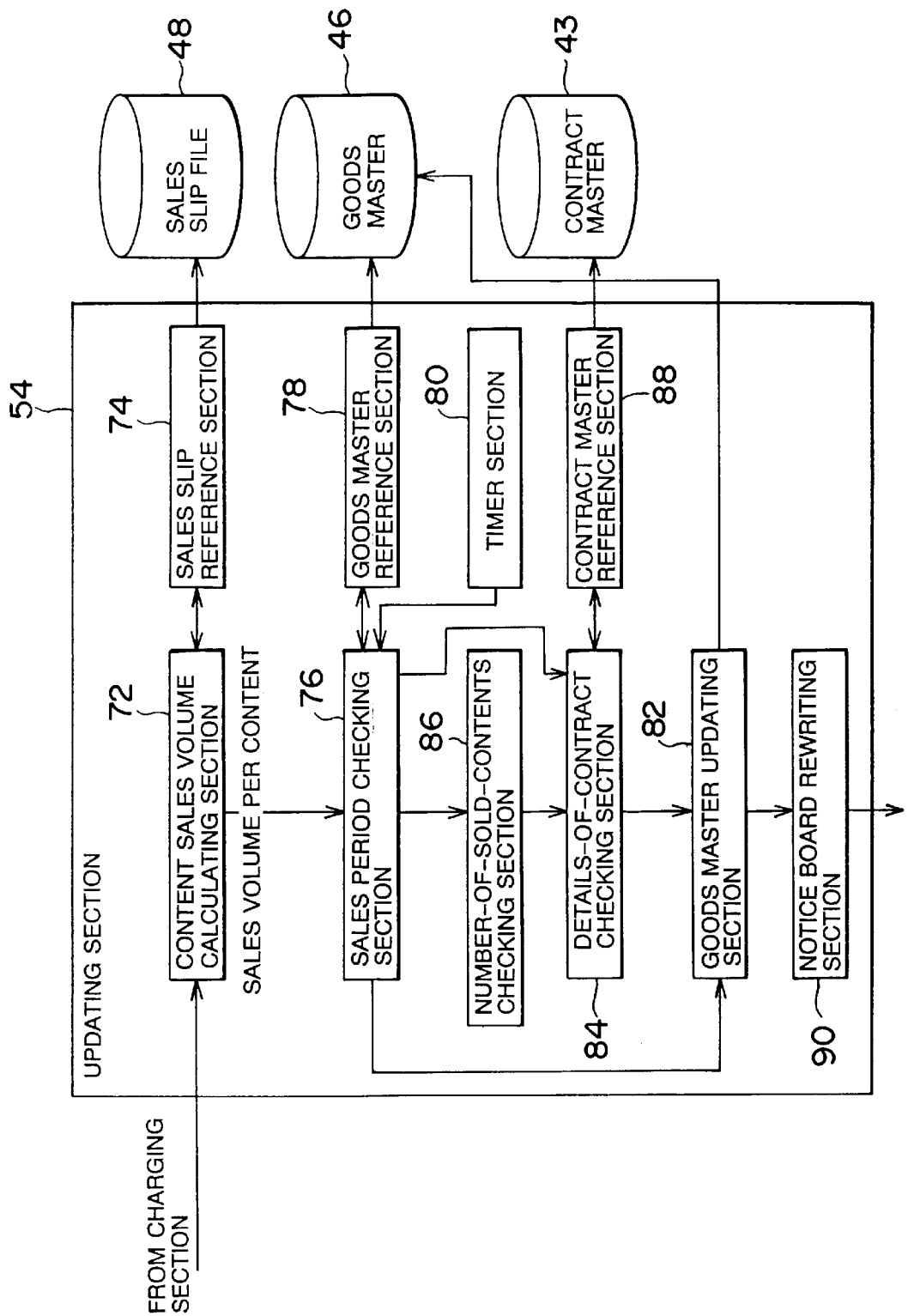
FIG. 5 is a block diagram illustrating a detailed configuration of an updating section shown in FIG. 3.

FIG. 5 illustrates an internal construction of the updating section 54. Upon receipt of a notice of the number of sales per content from the charging section 52, a content sales volume calculating section 72 of the updating section 54 indicates to a sales slip reference section 74 to read the sales price recorded on the sales slip stored in the sales slip file 48. The content sales volume calculating section 72 calculates a sales volume per content on the basis of the number of sales per content received from the charging section 52 and the sales prices recorded on the sales slip.

A sales period checking section 76 indicates to a goods master reference section 78 to read a sales period of each content that is stored in the goods master 46. Also, a timer section 80 inputs an item of present date data to this sales period checking section 76. The sales period checking section 76 determines a content with the last date of the sale period that is the same as the present date and notifies the goods master updating section 82 of this content. Further, the sales period checking section 76 determines a content having one remaining month or less up to the last date of the sales period from the present date and notifies a details-of-contract checking section 84 of this content. Moreover, the sales period checking section 76 notifies a number-of-sold-contents checking section 86 of contents exclusive of that content. The number-of-sold-contents checking section 86 searches for a content with a total number of sales numbering 1000 or less per month among the contents indicated by the sales period checking section 76 on the basis of the number of sales per content that has been indicated by the charging section 52. The number-of-sold-contents then notifies the details-of-contract checking section 84 of this content.

The details-of-contract checking section 84, upon receiving the notice of the content from the sales period checking section 76 or the number-of-sold-contents checking section 86, indicates to a contract master reference section 88 to read details of contract with respect to the notified content from the contract master 43. The details-of-contract checking section 84 determines a content permitted to reduce its sales price in accordance with the contract among the contents indicated on the basis of the details of contract. The details-of-contract checking section 84 notifies the goods master updating section 82 of this content.

The goods master updating section 82 deletes from the goods master 46 the data concerning the contents indicated directly from the sales period checking section 76. Further, the sales prices recorded in the goods master 46 of the contents indicated by the details-of-contract checking section 84 are rewritten as lower prices.

A notice board rewriting section 90 copies respective content IDs, titles thereof and sales prices thereof with respect to all of the contents recorded in the goods master 46 and overwrites them on a notice board 50 of the key sales section 44, as shown in FIG. 3.

In a preferred embodiment of the present invention, as shown in FIGS. 3–5, the content database 41 and the contract master 43 are separate databases. However, another of embodiment of the present invention stores the contents of both the content database 41 and the contract master 43 in a single, two-layer database. In a single, two-layer database embodiment of the present invention, the above-described order of access to the content database 41 and the contract master 43 would be preserved.

A flow of selling the contents through the content distribution system in this embodiment is explained with reference to flowcharts shown in FIGS. 6 to 11.

Figure 6:
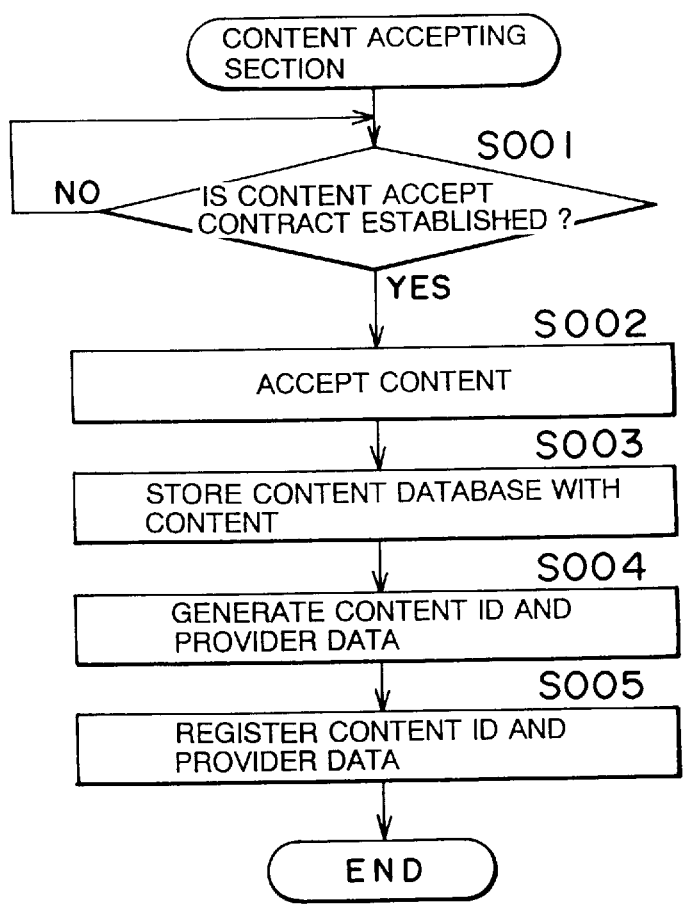
FIG. 6 is a flowchart showing processes for accepting a content that are executed by a content accepting section shown in FIG. 3.

FIG. 6 shows processes for accepting the content by the content accept section 40 of the SD center 21.

In step S001 shown in FIG. 6, the content accept section 40 checks whether or not the operator of the SD center 21 and the provider 22 have entered into a content accept contract. Then, if the content accept contract has been established, in step S002 the content is accepted by being input via a drive device or a communication interface (neither of which are shown).

In step S003, the content accepted in step S002 is stored in the content database 41.

Generated in subsequent step S004 are a content ID labelling the content stored in the content database in step S003 and above-mentioned provider data (about the authoring ID of the provider 22, the IDs of other rightful claimants 23 and the shares of those parties).

In next step S005, the content IDs and the provider data that are generated in step S004 are registered in the content database 41.

Figure 7:
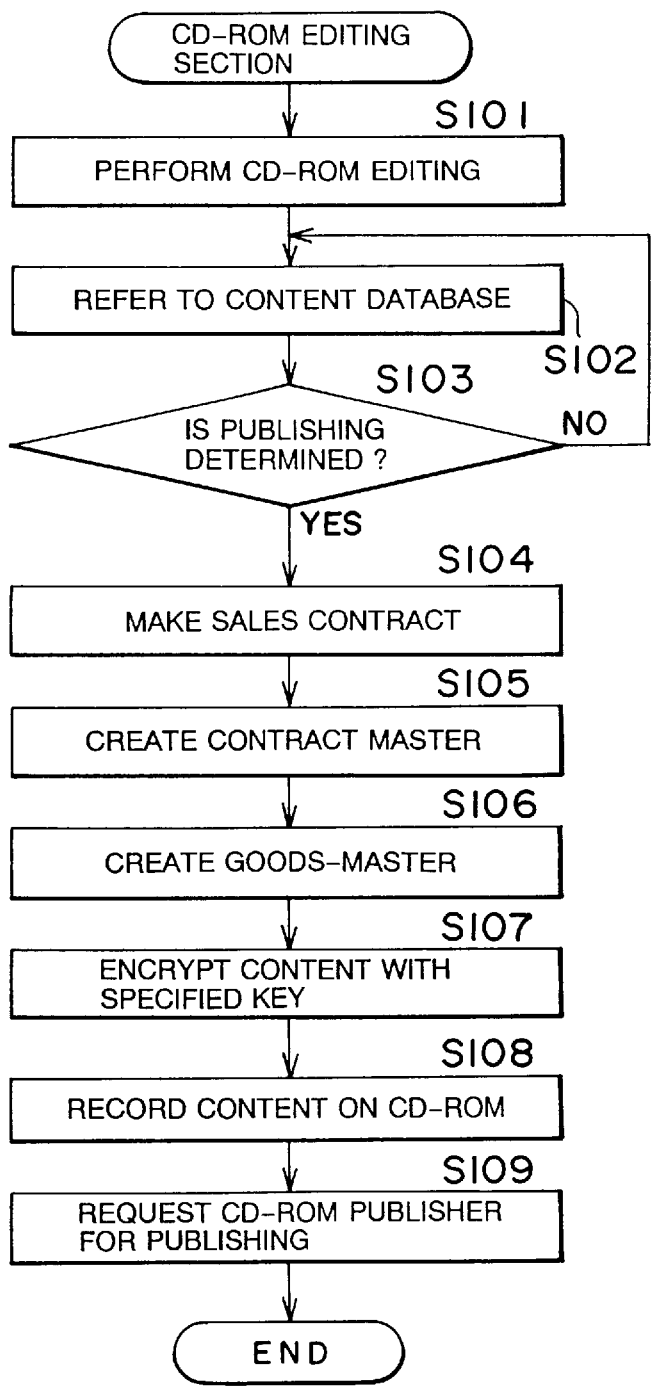
FIG. 7 is a flowchart showing CD-ROM editing processes executed by a CD-ROM editing section shown in FIG. 3.

FIG. 7 shows processes for the CD-ROM editing executed by the CD-ROM editing section 42 of the SD center 21.

In step S101 shown in FIG. 7, a CD-ROM editing operation is started in conformity with an instruction issued from the operator.

In step S102, the CD-ROM editing section 42 determines by referring to the content database 22 whether a good content conforming to an editing concept exists. In subsequent step S103, the CD-ROM editing section 42 checks whether the publishing of the content searched from the content database 22 is determined. Then, if not determined, the processing returns to step S102 to determine other contents. On the other hand, if determined, the processing proceeds to step S104.

Implemented in step S104 is a contract between the provider 22 (and other rightful claimant 23 concerned with the relevant content) and establishing operation for the content the publishing of which is determined.

In next step S105, the contract master 43 is created based on the sales contract established in step S104.

In subsequent step S106, the goods master 46 is created from the number of the CD-ROM recorded with the relevant content, the effective period thereof, the content ID, the sales price and the sales effective period.

In step S107, the content with established sales contract is encrypted by a specified key. The key used for this encryption is also stored in the goods master 46.

Recorded on the original CD-ROM in step S108 are the encrypted content (which is the genuine content encrypted), a trial version content based on the genuine content but having less functions, the navigator (program), and the installer.

In next step S109, the completed original CD-ROM is sent to the CD-ROM publisher 24, and the CD-ROM editing section 42 requests the publisher 24 to publish the CD-ROM.

The CD-ROM publisher 24, in response to this publishing request, creates a multiplicity of CD-ROMs 31 based on the original CD-ROM, sells the CD-ROM 31 to the users 5 and sends the CD-ROMs 31 to the membership users 28 registered in the network service company 26. Then, the user 28 acquiring this CD-ROM 31 loads the CD-ROM 31 into the personal computer and executes the installer within the CD-ROM 31. Hereupon, the navigator (program) 32 is installed into the hard disk 34, and the machine ID unique for each individual personal computer is generated and then written to the hard disk 34.

Figure 8:
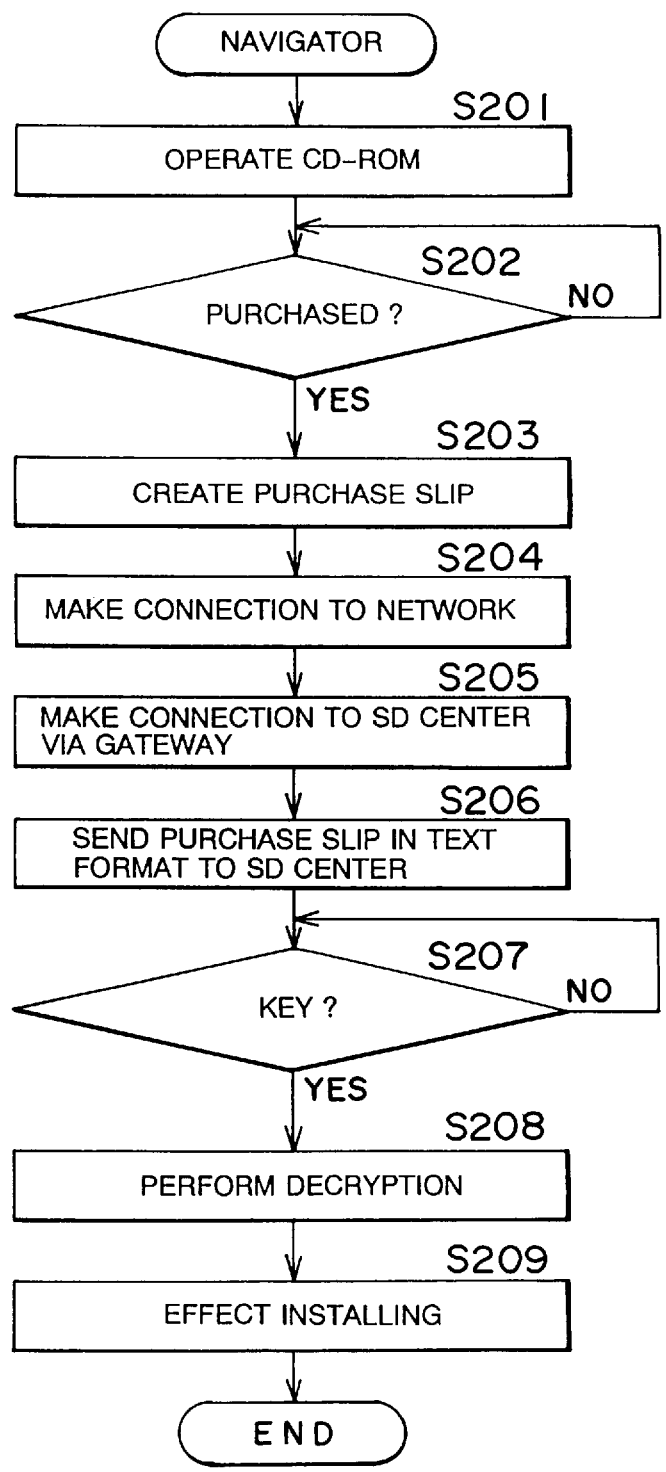
FIG. 8 is a flowchart showing processes for purchasing the content that are executed by a navigator shown in FIG. 2.

FIG. 8 shows content purchasing processes executed by the navigator 32 installed into the personal computer 27.

In step S201 shown in FIG. 8, in response to an operation from the user 28, the navigator 32 operates the CD-ROM 31. Displayed on the screen is, for example, a menu such as a purchase accept menu stored in the CD-ROM 31. In addition, the trial version content is set in a trial status.

In S202, the navigator 32 waits until the user 28 determines which content to purchase.

Step S203 is executed if purchase of the content of the CD-ROM is determined. In step S203, the access number is generated based on the content ID of the content determined to be purchased as well as on the CD-ROM number of the CD-ROM 31. Then, a purchase slip in a text data format is created based on the CD-ROM number, the content ID, the access number and the user ID of the relevant user 28. A memory (which is not shown) stores the thus generated access number.

In step S204, a communication program (which is not shown) is started, and the personal computer 27 is connected to the network service company 26 via the public telephone network.

In subsequent step S205, the personal computer 27 is connected via the gateway 25 to the key sales section 44 of the SD center 21.

In step S206, the purchase slip created in step S203 is transmitted as a file in text format to the key sales section 44.

In step S207, the navigator 32 waits for the key (purchase number) being transmitted from the key sales section 44 in accordance with this purchase slip.

In subsequent step S208, the purchase number transmitted from the key sales section 44 is demodulated based on the access number held in the memory (not shown), thus removing the key. Then, the encrypted content the user 28 decided to purchase is decrypted by use of this key.

In step S209, the thus decrypted content is installed on the hard disk 34. With the above, the processes by this navigator 32 terminate.

Figure 9:
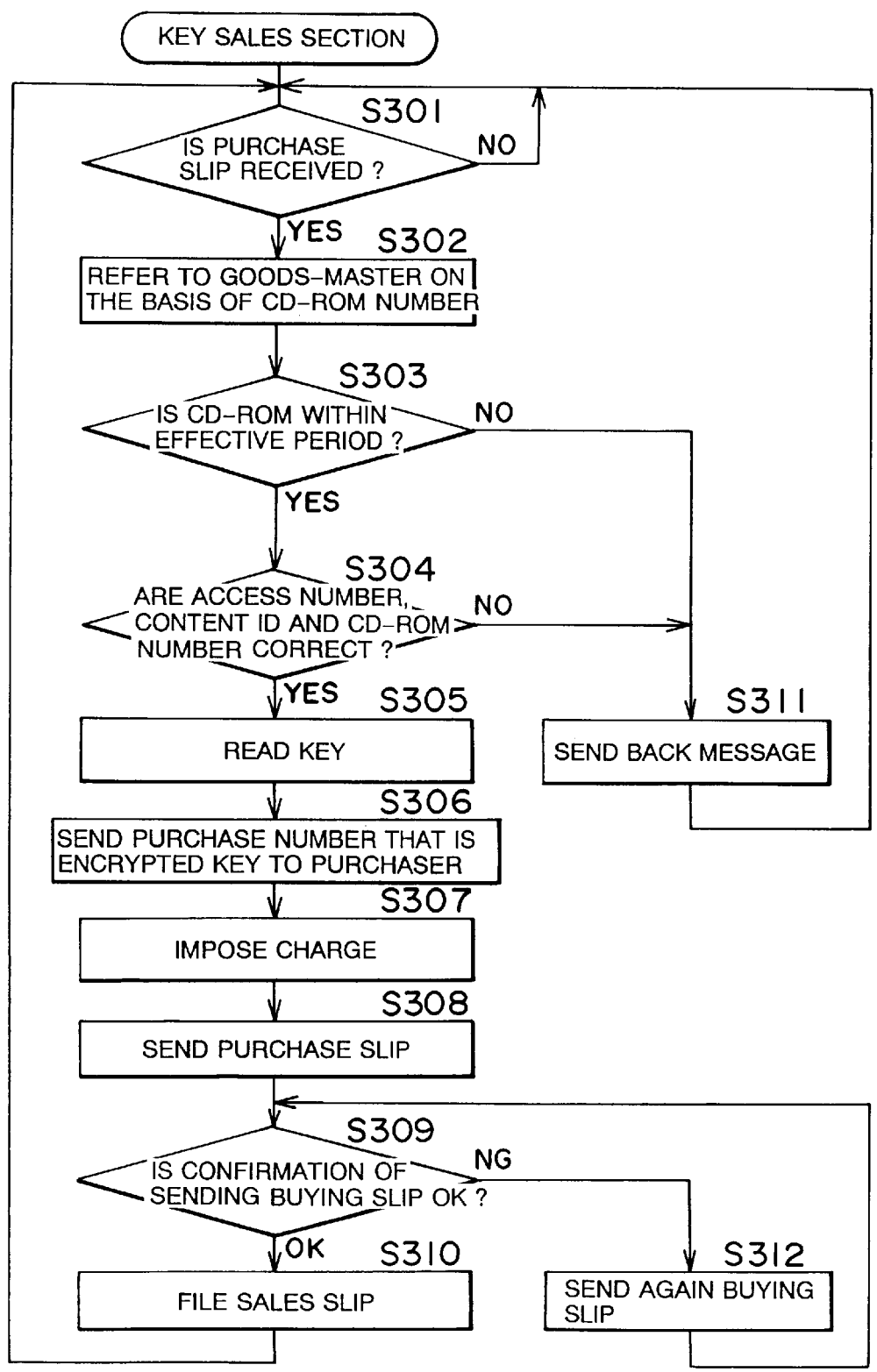
FIG. 9 is a flowchart showing processes for selling a key that are executed by a key selling section shown in FIG. 3.

FIG. 9 shows processes for selling the content, which are executed by the key sales section 44 of the SD center 21.

In step S301 shown in FIG. 9, the key sales section 44 waits for receipt of the purchase slip from the user 28. In step S302, executed when the purchase slip is received, the goods master 46 is referred to based on the CD-ROM number recorded on the purchase slip.

In subsequent step S303, the key sales section 44 checks whether the CD-ROM corresponding to the CD-ROM number recorded on the purchase slip falls at present within the effective period on the basis of the effective period of the CD-ROM registered in the goods master 46 referred to in step S302. If not within the effective period at present, in step S311 a message conveying that a deadline for the effective period is reached is set to the personal computer 27 of the user 28. The processing returns to step S301 in order to wait for a next purchase slip.

In step S304, executed when falling at present within the CD-ROM effective period, the key sales section 44 checks whether the CD-ROM number and the content ID that are recorded on the purchase slip are identical with those registered in the goods master 46, on the basis of the goods master 46 referred to in step S302, and whether the access number recorded on the purchase slip is theoretically correct. Then, if the CD-ROM number and the content ID that are recorded on the purchase slip are not identical with those registered in the goods master 46, or if the access number is theoretically correct, in step S311 a message same is sent back to the personal computer 27 of the user 28; the processing returns to step S301 to wait for a next purchase slip. The content ID of the content exceeding the sales period is, as discussed herein above, deleted from the goods master 46 by the updating section 54. Hence, if that content ID is recorded on the purchase slip, this is eliminated in this step.

On the other hand, if the CD-ROM number, the content ID and the access number are all correct, in step S305 the key (used for encrypting the content corresponding to the content ID) is read from the goods master 46.

In step S306, the key read in step S305 is encrypted by the access number and transmitted back to the personal computer 27 of the user 28.

In subsequent step S307, an accounting process is implemented. As discussed herein above, the purchase slip and the sales slip are made.

In step S308, the purchase slip made in step S307 is sent to the personal computer 27 of the user 28.

In subsequent step S309, the key sales section 44 confirms whether the purchase slip was transmitted correctly in step S308. Then, if not transmitted correctly, the purchase slip is again transmitted in step S312, and the processing returns to step S309.

If the purchase slip was transmitted correctly, step S310 is executed. In step S310, the sales slip made in step S307 is filed in the sales slip file 48. With the above, the processes for one sheet of the purchase slip are ended, and, therefore, the processing returns to step S301 to wait for a next purchase slip.

Figure 10:
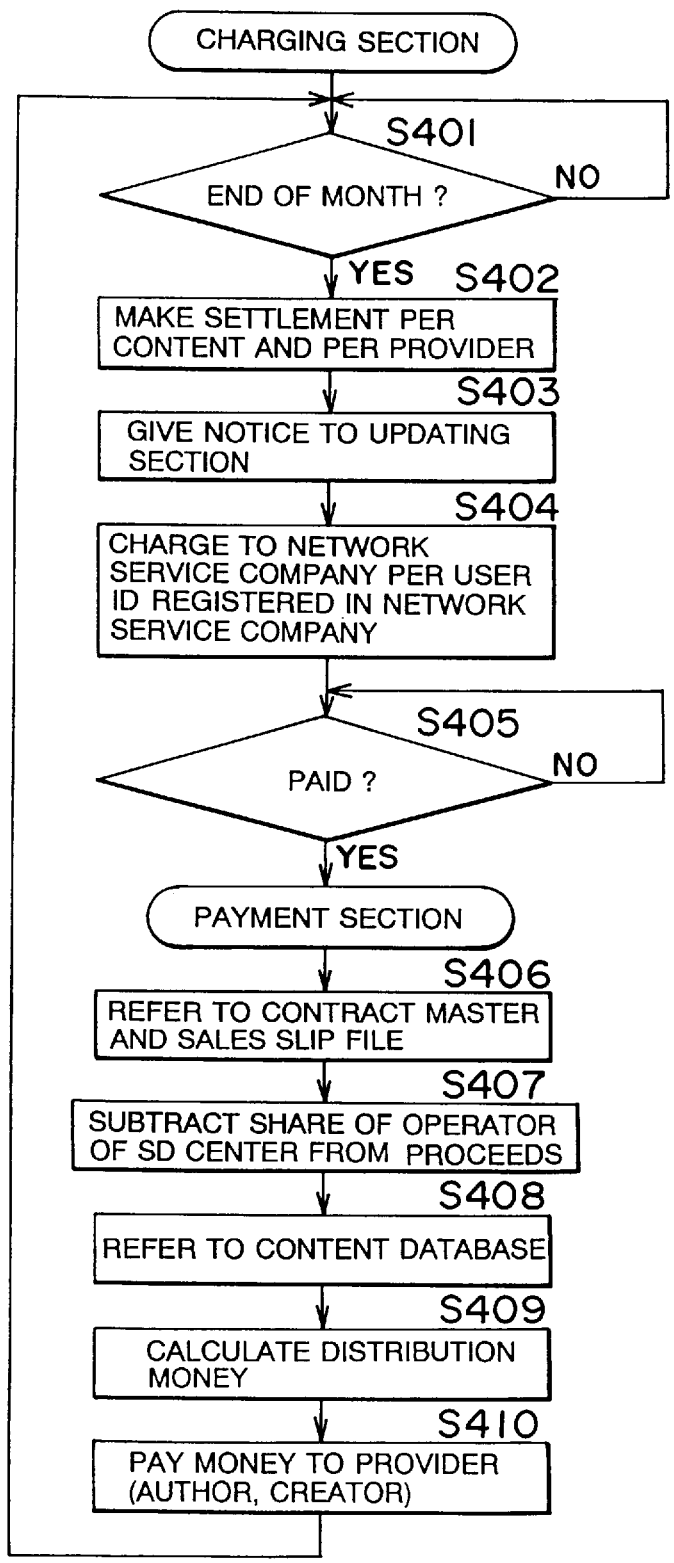
FIG. 10 is a flowchart showing charging processes executed by a charging section and paying processes executed by a payment section shown in FIG. 3.

FIG. 10 shows charging processes executed by the charging section 52 of the SD center 21 and paying processes executed by the payment section 56.

In step S401 in FIG. 10, the charge section 10 checks whether the present date is the end of month or not and waits until the end of month arrives. Then, when the present date arrives at the end of month, in step S402 all the sales slips accumulated in the sales slip file 48 are read, and the number of sales slips is settled per content and per provider 22.

In next step S403, the updating section 54 is notified of the number of sales slips per content.

In subsequent step S404, the read sales slips are assembled per user ID registered in the network service company 26, and the amount of proceeds is added up per user ID. Subsequently, the charging section 52 charges the network service company 26 for the added-up amount of proceeds per user ID. Upon receiving this charge, the charging proxy section 29 of the network service company 26 adds this content price to the service using charge of each user 28 and demands payment by the credit card company 30 for this added mount of money. The credit card company 30, upon receiving the demand, debits this amount of money charged out of the bank account of each user 28 and pays it to the charging proxy section 29 of the network service company. The charging proxy section 29 deducts the service using charge and the predetermined fee per user 28 from the amount of money received and pays the remainder to the SD center 21.

In step S405 in FIG. 10, the charging section 52 waits for the payment from the charging proxy section 29 of the network service company 26, and, when paid, processing is transferred to the payment section 56.

The payment section 56 of the SD center 21, as indicated in step S406 of FIG. 10, refers to the contract master 43 and the sales slip file 48 (corresponding to the first reading section). In step S407, a share of the operator of the SD center 21 is subtracted from the amount of proceeds (corresponding to the subtracting section). The sales slips accumulated in the sales slip file 48 are sorted out for each content, and the sales prices recorded on all the sales slips are added up per content. On the other hand, a share rate of the operator of the SD center 21 is read from the record of the payment site registered in the contract master 43. Then, the share of the operator of the SD center 21 is subtracted from the added-up amount of proceeds per content.

In step S408, the payment section 56 refers to the content database 41. That is, the provider data are read per content (corresponding to the second reading section).

In subsequent step S409, an amount of distribution money is calculated (corresponding to the distributing section). That is, the proceeds after being subtracted are distributed per ID (ID of a single number or a plurality of providers 22, or, IDs of a single number or a plurality of providers 22 and of a single number or a plurality of other rightful claimants 23) contained in the provider data of the individual contents. In this case, if the provider data contains the data of the shares of the parties 22 and 23, the proceeds are evenly distributed to the respective IDs. If the provider data contain the data of the shares of the respective parties 22 and 23, however, the proceeds are distributed according to this item of data of the shares.

In next step S410, the proceeds distributed in step S409 are deposited into the bank accounts of the individual providers 22 and of other rightful claimants 23 in accordance with the respective IDs of the parties 22 and 23. Thereafter, the processing returns to step S401 in the charging section 52 in preparation for the charging processes in next month.

Figure 11:
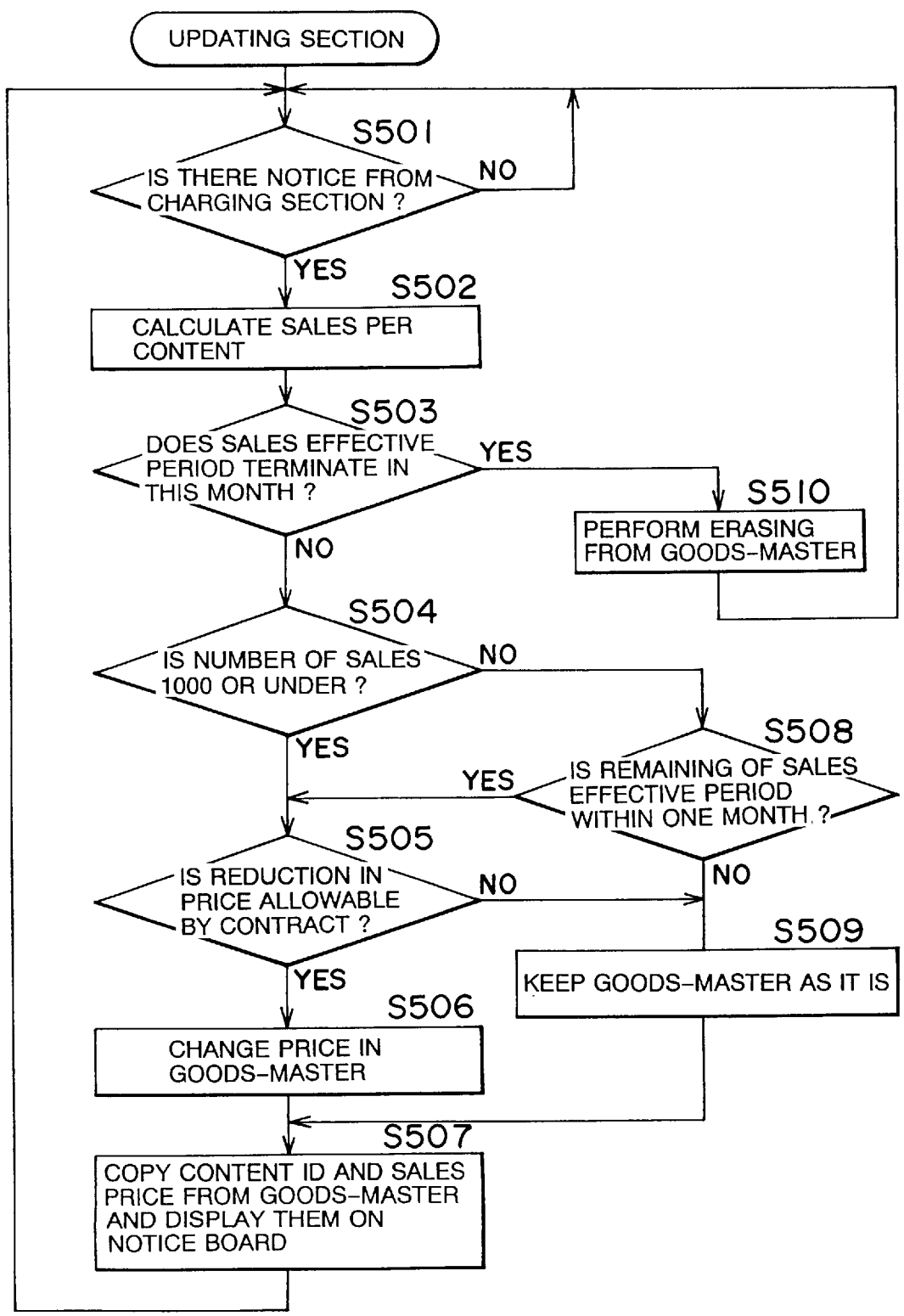
FIG. 11 is a flowchart showing updating processes executed by an updating section shown in FIG. 3.

FIG. 11 shows processes for updating in the goods master 46 that are executed by the updating section 54 of the SD center 21.

In step S501 the updating section 54 awaits a notice of the number of sales slips per content from the charging section 52.

In step S502 executed when the notice of the number of sales slips is received, the sales are calculated per content.

In step S503, the updating section 54 checks determines whether the last day of the sales effective period is within this month with reference to the sales effective period for each content that is registered in the goods master 46. Then, for a content having the last day of the sales effective period within this month, the data in this content are erased from the goods master 46 in step S510.

In contrast with this, for a content having the last day of the sales effective period outside of this month, whether the number of sales in this month is 1000 or less is determined in step S504. Then, for the content having the number of sales 1000 or less, a process in step S505 is executed.

In contrast, with respect to the content the sold number of which exceeds 1000, in step S508 the updating section 54 checks whether the remainder of the sales effective period is within one month by referring again to the sales effective period per content that is registered in the goods master 46. Then, for a content with the remainder of the sale effective period exceeding one month, the goods master 46 remains unchanged (in step S509), and the processing proceeds to step S507. Further, for a content that with the remainder of the sale effective period within one month, the process in step S505 is executed.

The details of the contract of each content that are registered in the contract master 43 are examined in step S505, thereby checking whether a reduction of the sales price of a processing target content is permitted. Then, if not permitted, the goods master 46 remains unchanged (in step S509), and the processing proceeds to step S507. If permitted, the sales price of the processing target content that is registered in the goods master 46 is reduced at a fixed rate, and the processing moves forward to step S507.

In step S507, the content IDs and the sales prices of all the contents are copied from the goods master 46 and displayed on the notice board 50 of the key sales section 44. Thereafter, the processing returns to step S501 to wait for a next notice from the charging section 52.

As shown in FIG. 11, the price of a program or other content of a CD-ROM 31 can be changed according to a time condition. As discussed herein above with reference to FIG. 11, a second aspect of the present invention is the ability to provide a discount for a sales price of a content of the CD-ROM 31. In summary of the second aspect of the present invention, and also with reference to FIG. 11, step S503 determines whether the sales effective period for a content will terminate this month (for example). If the sales effective period for the content terminates this month, then the content cannot be sold any longer. Therefore, in step S510, the content is deleted from the goods master 46 database. The CD-ROM 31 may still contain that particular content, but the key required to decrypt that particular content is no longer sold. Therefore, a user 28 cannot access that particular content. In step S504, the total number of sale is determined. If the total number of sales is, also for example, less than 1,000 for a particular content for a given month, then (as shown in step S505) the contract master 43 database is read to determine whether a reduction in price for that particular content is allowable, by contract. If a reduction in price Is allowable, in step S506, the goods master 46 database entry for the price corresponding to that particular content is lowered. In step S507, the notice board (which is element 42 shown in FIG. 3) tracks sales levels on-line.

Figure 12:
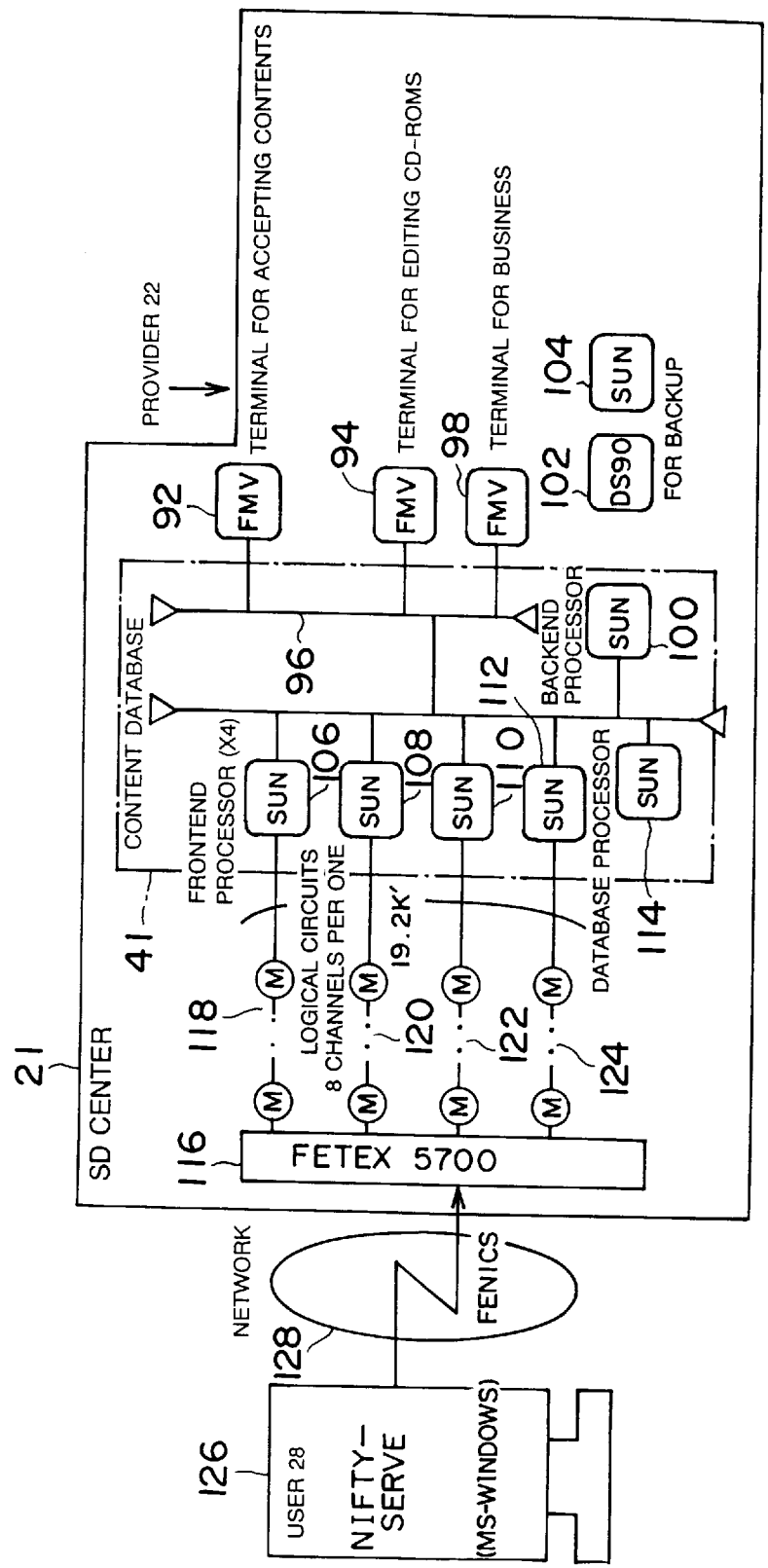
FIG. 12 is a diagram of a hardware configuration of the present invention.

FIG. 12 shows a preferred embodiment of the present invention. As shown in FIG. 12, a provider 22 provides contents to be placed on a CD-ROM to an SD center 21. The contents is accepted by the SD center 21 and stored on a Fujitsu FMV(tm) Personal Computer 92. The Fujitsu FMV (tm) Personal Computer 92 is provided as a terminal for accepting the contents, and stores the contents in a content database 41, described in detail herein above with reference to FIG. 3. The CD-ROM editing section 42, also as described in reference to FIG. 3, is implemented on a Fujitsu FMV (tm) Personal Computer 94. The Fujitsu FMV (tm) Personal Computer 94 is coupled to the Fujitsu FMV (tm) Personal Computer 92 by bus 96. Also as shown in FIG. 12, a terminal for business transactions is implemented on a Fujitsu FMV (tm) Personal Computer 98. The Fujitsu FMV (tm) Personal Computer 98 is also coupled to the bus 96 and interfaces through bus 96 with back end processor 100. Back end processor 100 is implemented on a SUN(tm) model of computer and executes the business processes in the SD center 21. Business processes in the SD center 21 include updating masters, managing sales, and monthly and daily batch processing of computer jobs.

A Fujitsu DS90(tm) model of business server computer 102 and a SUN model of computer 104 are provided as backup computers for the SD center 21.

Also coupled to bus 96 are 4 front end processors 106, 108, 110, and 112. Front end processors 106, 108, 110, and 112 are each implemented on SUN 4/20(tm) computers and implement application programs for accepting purchase of contents and interfacing with database processor 114. Database processor 114, in turn, interfaces with memory (not shown in FIG. 12) storing the goods master 46 and contract master 43 databases described with reference to FIG. 3. Front end processors 106, 108, 110, and 112 interface to a Fujitsu FETEX 5700(tm) switching system 116 through 19.2 kilobyte per second lines 118, 120, 122, and 124, respectively. Each of lines 118, 120, 122, and 124 carry 8 channels per line.

The SD center 21 interfaces to a user 28 having a computer running MS-WINDOWS(tm) and connected to a NIFTY-SERVE(tm) network through a FENICS(tm) network 128.

Figure 13:
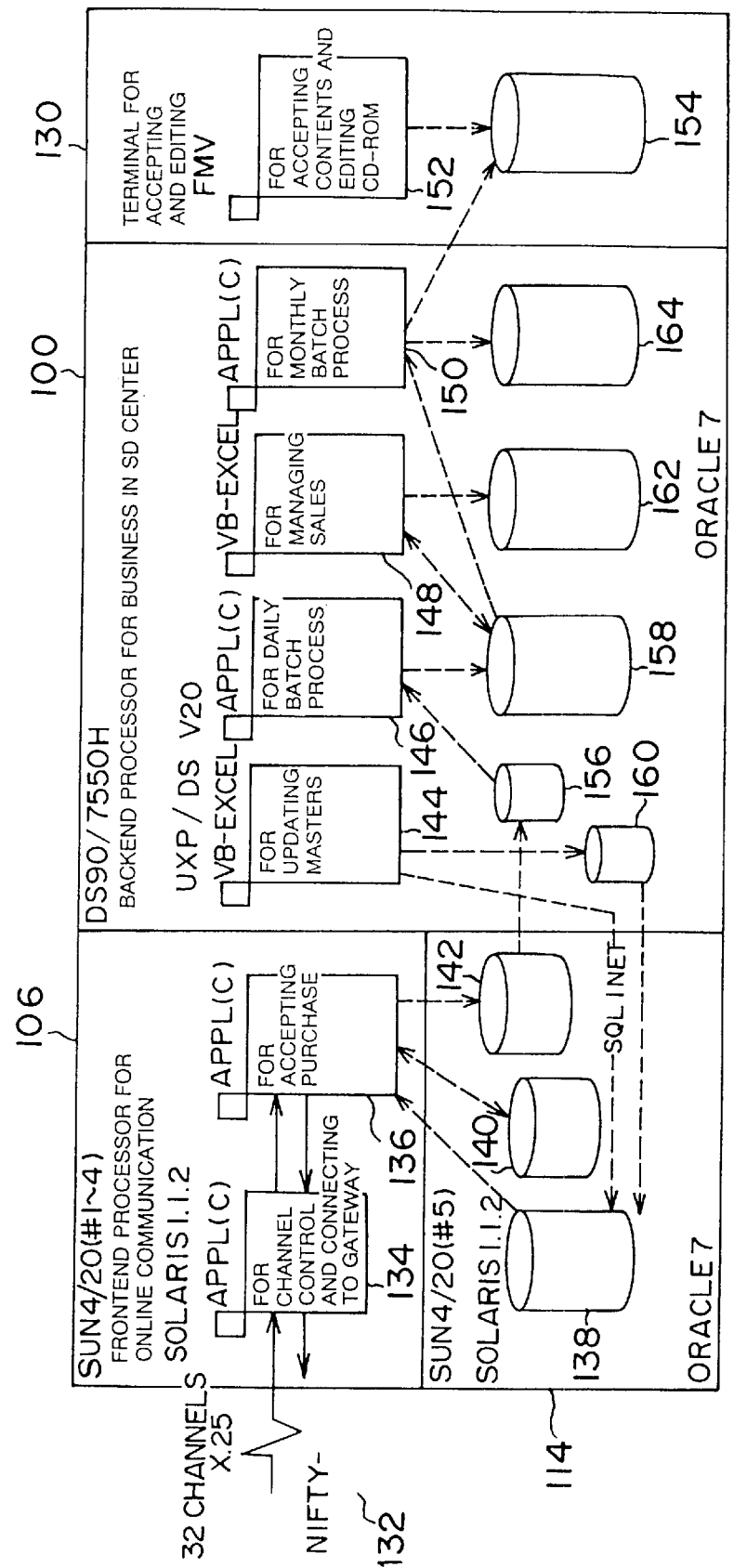
FIG. 13 is a diagram of a hardware configuration of the front end processors and the back end processor shown in FIG. 12.

FIG. 13 shows preferred embodiments of the back end processor 100, any one of front end processors 106, 108, 110, and 112 (with front end processor 106 shown as an example), database processor 114, and Fujitsu FMV(tm) computers 92 and 94 implemented as a terminal of accepting and editing contents 130.

As shown in FIG. 13, front end processor 106 interfaces to NIFTY-GATEWAY 132, which includes 32 channels and is running the X.25 communication protocol. Front end processor 106 is implemented on a SUN 4/20(tm) computer, running the SOLARIS 1.1.2(tm) operating system. Front end processor 106 is running channel control and gateway connection program 134, which logically interfaces the front end processor 106 to the NIFTY-GATEWAY(tm) 132. Channel control and gateway connection program 134 is coupled to application program 136, also running on the front end processor 106. Application program 136 accepts purchases of contents, and is a preferred embodiment of the key sales section 44 described with reference to FIG. 3. More specifically, application program 136 checks master databases (the goods master, the confidential master and the contract master), issues keys, and confirms purchases.

Also as shown in FIG. 13, database processor 114 is implemented, in a preferred embodiment, on a SUN 4/20 (tm) computer, running the SOLARIS 1.1.2(tm) operating system. The database processor 114 includes database 138, database 140, and database 142, each implemented on separate disk drives. Database 138 stores the goods master 46, a confidential master, and a contract master 46. Database 140 stores a purchase log. Database 142 stores a charging log and an access log. Databases 138, 140, and 142 are ORACLE(tm) 7 databases.

Database 138 can be accessed by SQL-NET(tm) from application program 144 running on back end processor 100. Back end processor 100, in a preferred embodiment, is a Fujitsu DS90/7550H(tm) computer, running the UXP/DS V20(tm) operating system. The back end processor 100 also runs application program 144, application program 146, application program 148, and application program 150. Application program 144 corresponds to the updating section 154 and updates the above-mentioned masters (the goods master 46, a confidential master, and the contract master 43). Application program 146 executes daily batch processes (i.e., accumulating sales, sales per customer, and logs). Application program 148 manages sales (i.e., determines balance, searches sales details, and deals with claims). Application program 150 executes monthly batch processes (i.e., payment, charge, shifting of accumulation, and balancing). The charging section 52 and the payment section 56 disclosed herein above in reference to FIG. 3 are implemented by application program 150. Application programs 144 and 148 are implemented, in a preferred embodiment, with VB-EXCEL(tm).

The terminal for accepting and editing 130 executes application program 152 under the Fujitsu FMV(tm) operating system. Application program 152 executes acceptance of contents and editing of a CD-ROM 31. The terminal for accepting and editing 130 includes database 154. Database 154 corresponds to the contents database 41 shown in FIG. 3.

The sales slip file shown in FIG. 3 is stored among databases 142, 156, and 158 shown in FIG. 13. Databases 156, 158, 160, 162, and 164, all included in back end processor 100, are implemented using ORACLE 7(tm). Various interfaces among the above-described application programs and databases with reference to FIG. 13 are also shown therein.

According to the content distribution system of the present invention, the remainder after a subtraction of the holding of the operator of the SD center 21 from the money of shares obtained by selling the contents is also distributed also to the parties 3, excluding the provider 22 but having some right of charge pertaining to the relevant content. It is therefore possible to eliminate the overhead of redistributing the proceeds to those parties 23 having the right of charge after the provider 22 as a representative has received the payment of the proceeds in bulk. Further, for such contents with the remainder of the sales effective period being one month or less and the number of sales per month being reduced to a fixed quantity or under, the sales prices can be reduced if the reduction is permitted in accordance with the terms of the sales contract. As a result, for contents with a limited selling period, as in the case of seasonal goods, and for contents allowed to be sold for a limited time by the SD center 21, the amount of sales within the period may be increased by stimulating the sales with a reduction of the sales price at the end of the sales period. Similarly, with respect to a content with a drop in the number of sales, a rational sales price may be set with the reduction, thereby improving the number of sales and the amount of sales.

As discussed above, according to the content proceeds distribution system and the distribution method of the present invention, the proceeds can be distributed to the third parties at the rate corresponding to the rights thereof, such parties each having the right of charge that is not prescribed in the sales contract of the sold content.

A wide range of different working modes can be formed based on the present invention without deviating from the spirit and scope of the present invention. The present invention, therefore, is not restricted by its specific working modes except being limited by the appended charges.

The present invention is not limited to the embodiments, described above, but also encompasses variations thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A content proceeds distribution system in a content distribution system for distributing proceeds obtained by selling a content provided by a content provider to distributees, said content proceeds distribution system comprising:
- a first database storing a first item of distribution data defining a rate at which an amount money of the proceeds is distributed to an operator of said content distribution system;
- a second database storing a second item of distribution data defining distribution rates and the distributees of a remaining amount of the proceeds after the amount of money of the proceeds is distributed to the operator;
- first reading means for reading the first distribution data from said first database;
- subtracting means for subtracting from the proceeds money corresponding to the rate specified in the first distribution data read by said first reading means;
- second reading means for reading the second distribution data from said second database; and
- distributing means for distributing an amount of money obtained by multiplying a remainder after subtraction by said subtracting means by the corresponding distribution rate specified in the second distribution data to each of the distributees specified in the second distribution data read by said second reading means.

2. A content proceeds distribution system according to claim 1, wherein the content is distributed in an encrypted status, and the content is sold by supplying a party desiring to purchase the content with a key for decrypting the content in said content distribution system.

3. A content proceeds distribution system according to claim 2, wherein the proceeds are paid by the purchaser as a compensation for supplying the key to the purchaser.

4. A content proceeds distribution system according to claim 1, further comprising:
- recording means for recording a sales price and a number of sales of a same content; and
- calculating means for calculating a total sum of the proceeds of the same content on the basis of the sales price and the number of sales that are recorded in said recording means,
- wherein said subtracting means performs the subtraction from a total sum of the proceeds calculated by said calculating means.

5. A content proceeds distribution method in a content distribution system for distributing proceeds obtained by selling a content provided by a content provider to specified distributees, said content proceeds distribution method comprising:
- a first storing step of storing a first database with a first item of distribution data defining a rate at which an amount of money of the proceeds is distributed to an operator of said content distribution system;
- a second storing step of storing a second database with a second item of distribution data defining distribution rates and the distributees of an amount of money of the proceeds after being distributed to the operator;
- a first reading step of reading the first distribution data from said first database;
- a subtracting step of subtracting from the proceeds money corresponding to the rate specified in the read first distribution data;
- a second reading step of reading the second distribution data from said second database; and
- a distributing step of distributing an amount of money obtained by multiplying a remainder after the subtraction in said subtracting step by a corresponding distribution rate specified in the second distribution data to each of the distributees specified in the second distribution data read in said second reading step.

6. A content proceeds distribution system in a content distribution system for distributing proceeds obtained by selling a content provided by a content provider to specified distributees, said content proceeds distribution system comprising:
- a database storing an item of distribution data about distribution rates and distributees of the proceeds;
- reading means for reading the distribution data from said database; and
- distributing means for distributing a distribution amount based on the distribution rate to each of the distributees specified in the distribution data read by said reading means.

7. A content proceeds distribution system in a content distribution system for distributing proceeds obtained by selling a content provided by a content provider to specified distributees, said content proceeds distribution system comprising:
- a first database storing a first item of distribution data about distributees of a remaining amount of money of the proceeds after being distributed to the operator;
- a second database storing a second item of distribution data about the distributees of an amount of money of the proceeds after being distributed to the operator;
- first reading means for reading the first distribution data from said first database;
- subtracting means for subtracting from the proceeds money corresponding to the rate specified in the first distribution data read by said first reading means;
- second reading means for reading the second distribution data from said second database; and
- distributing means for distributing a remainder after subtraction by said subtracting means to each of the distributees specified in the second distribution data read by said second reading means.

8. An apparatus for determining, for an operator, operator proceeds allocated to the operator assembling a CD-ROM comprising contents and, for each rightful claimant including providers and third parties, rightful claimant proceeds allocated to rightful claimants to the contents, user proceeds from users purchasing the CD-ROM comprising the operator proceeds and the rightful claimant proceeds, said apparatus comprising:
- a contract master database comprising respective operator IDs and operator proceeds distribution rates corresponding to each of the operators;
- a content database comprising respective rightful claimant IDs and rightful claimant proceeds distribution rates corresponding to each of the rightful claimants; and
- a computer coupled to the contract master database and to the content database, said computer reading the respective operator IDs and operator proceeds distribution rates from the contract master database, determining rightful claimant proceeds by subtracting the operator proceeds from the user proceeds, and reading the respective rightful claimant IDs and rightful claimant proceeds distribution rates from the content master database, and distributing the respective proceeds to the operator and to the rightful claimants.

9. The apparatus according to claim 8, further comprising:

a sales slip file comprising a number of sales in a month of each, respective content; and a goods master database comprising a sales price of each, respective content,
  wherein the contract master database further comprises data indicating whether the sales price of each, respective content is allowed to be reduced, said computer determining whether the number of sales of each, respective content in the month is less than a sales target and updating the sales price of each, respective content having the number of sales in the month less than the sales target if the data indicates the sales price is allowed to be reduced.

10. A method for determining, for an operator, operator proceeds allocated to the operator assembling a CD-ROM comprising contents and, for each rightful claimant including providers and third parties, rightful claimant proceeds allocated to rightful claimants to the contents, user proceeds from users purchasing the CD-ROM comprising the operator proceeds and the rightful claimant proceeds, said method comprising the steps of:

storing in a contract master database respective operator IDs and operator proceeds distribution rates corresponding to each of the operators;

storing in a content database respective rightful claimant IDs and rightful claimant proceeds distribution rates corresponding to each of the rightful claimants;

reading, by a computer, the respective operator IDs and operator proceeds distribution rates from the contract master database;

determining, by the computer, rightful claimant proceeds by subtracting the operator proceeds from the user proceeds;

reading, by the computer, the respective rightful claimant IDs and rightful claimant proceeds distribution rates from the content master database; and distributing respective proceeds to the operator and to the rightful claimants.

11. The method according to claim 10, further comprising the steps of:

storing, in a sales slip file, a number of sales in a month of each, respective content;

storing, in a goods master database, a sales price of each, respective content;

storing, in the contract master database, data indicating whether the sales price of each, respective content is allowed to be reduced;

determining, by the computer, whether the number of sales of each, respective content is less than a sales target; and updating, by the computer, the sales price of each, respective content having the number of sales less than the sales target if the data indicates the sales price is allowed to be reduced.

12. An apparatus for determining, for an operator, operator proceeds allocated to the operator assembling a CD-ROM comprising contents and, for each rightful claimant including providers and third parties, rightful claimant proceeds allocated to rightful claimants to the contents, user proceeds from users purchasing the CD-ROM comprising the operator proceeds and the rightful claimant proceeds, said apparatus comprising:

a database, said database comprising:
  a contract master layer comprising respective operator IDs and operator proceeds distribution rates corresponding to each of the operators, and
  a content layer comprising respective rightful claimant IDs and rightful claimant proceeds distribution rates corresponding to each of the rightful claimants; and a computer coupled to the database, said computer reading the respective operator IDs and operator proceeds distribution rates from the contract master layer, determining rightful claimant proceeds by subtracting the operator proceeds from the user proceeds, and reading the respective rightful claimant IDs and rightful claimant proceeds distribution rates from the content layer, and distributing the respective proceeds to the operator and to the rightful claimants.

13. The apparatus according to claim 12, further comprising:

a sales slip file comprising a number of sales in a month of each, respective content; and a goods master database comprising a sales price of each, respective content,
  wherein the contract master layer further comprises data indicating whether the sales price of each, respective content is allowed to be reduced, said computer determining whether the number of sales of each, respective content in the month is less than a sales target and updating the sales price of each, respective content having the number of sales in the month less than the sales target if the data indicates the sales price is allowed to be reduced.

14. A method for determining, for an operator, operator proceeds allocated to the operator assembling a CD-ROM comprising contents and, for each rightful claimant including providers and third parties, rightful claimant proceeds allocated to rightful claimants to the contents, user proceeds from users purchasing the CD-ROM comprising the operator proceeds and the rightful claimant proceeds, said method comprising the steps of:

storing in a contract master layer of a database respective operator IDs and operator proceeds distribution rates corresponding to each of the operators;

storing in a content layer of the database respective rightful claimant IDs and rightful claimant proceeds distribution rates corresponding to each of the rightful claimants;

reading, by a computer, the respective operator IDs and operator proceeds distribution rates from the contract master layer;

determining, by the computer, rightful claimant proceeds by subtracting the operator proceeds from the user proceeds;

reading, by the computer, the respective rightful claimant IDs and rightful claimant proceeds distribution rates from the content layer; and distributing the respective proceeds to the operator and to the rightful claimants.

15. The method according to claim 14, further comprising the steps of:

storing, in a sales slip file, a number of sales in a month of each, respective content;

storing, in a goods master database, a sales price of each, respective content;

storing, in the contract master layer, data indicating whether the sales price of each, respective content is allowed to be reduced;

determining, by the computer, whether the number of sales of each, respective content is less than a sales target; and updating, by the computer, the sales price of each, respective content having the number of sales less than the sales target if the data indicates the sales price is allowed to be reduced.

16. A content proceeds distribution system in a content distribution system for distributing proceeds obtained by selling a content provided by a content provider to distributees, said content proceeds distribution system comprising:

a first database storing a first item of distribution data defining a rate at which an amount money of the proceeds is distributed to an operator of said content distribution system;

a second database storing a second item of distribution data defining distribution rates and the distributees of a remaining amount of the proceeds after the amount of money of the proceeds is distributed to the operator;

a first reading section reading the first distribution data from said first database;

a subtracting section subtracting from the proceeds money corresponding to the rate specified in the first distribution data read by said first reading section;

a second reading section reading the second distribution data from said second database; and a distributing section distributing an amount of money obtained by multiplying a remainder after subtraction by said subtracting section by the corresponding distribution rate specified in the second distribution data to each of the distributees specified in the second distribution data read by said second reading section.

17. A content proceeds distribution method in a content distribution system for distributing proceeds, said content proceeds distribution method comprising:

storing in a first database a first item of distribution data defining a rate at which an amount of proceeds obtained by selling a content provided by a content provider to specified distributees is distributed to an operator of said content distribution system;

storing in a second database a second item of distribution data defining distribution rates and the distributees of an amount of the proceeds after being distributed to the operator;

reading the first distribution data from said first database;

subtracting from the proceeds money corresponding to the rate specified in the read first distribution data;

reading the second distribution data from said second database; and distributing an amount of money obtained by multiplying a remainder after the subtraction in said subtracting step by a corresponding distribution rate specified in the second distribution data to each of the distributees specified in the second distribution data read in said second reading step.

* * * * *

UNITED STATES PATENT AND TRADEMARK OFFICE
CERTIFICATE OF CORRECTION

PATENT NO. : 5,884,280
DATED : March 16, 1999
INVENTOR(S) : Yoshioka et al.

It is certified that error appears in the above-indentified patent and that said Letters Patent is hereby corrected as shown below:

Title Page [75], "Kanagawa," should be --Kawasaki,--.

Col. 16, line 45, "Is" should be --is--.

Signed and Sealed this

Fifth Day of October, 1999

Q. TODD DICKINSON

Attest:

Attesting Officer

Acting Commissioner of Patents and Trademarks

UNITED STATES PATENT AND TRADEMARK OFFICE
CERTIFICATE OF CORRECTION

PATENT NO.:     5,884,280
DATED      :     March 16, 1999
INVENTOR(S):    Yoshioka et al.

It is certified that error appears in the above-identified patent and that said Letters Patent is hereby corrected as shown below:

Col. 14,    line 63, "mount" should be --amount--.

Signed and Sealed this

Twenty-third Day of November, 1999

Attest:

Q. TODD DICKINSON

Attesting Officer          Acting Commissioner of Patents and Trademarks